(12) United States Patent
Dehuvyne et al.

(10) Patent No.: US 7,479,184 B1
(45) Date of Patent: Jan. 20, 2009

(54) RESIN COMPOSITION COMPRISING A PHOSPHOROUS CONTAINING SURFACTANT FOR PRESSURE SENSITIVE ADHESIVES

(75) Inventors: Bart S A Dehuvyne, Molenbeek (BE); Alain Bouvy, Wezembeek Oppem (BE); Zahra M Mowafy, West Chester, PA (US)

(73) Assignees: Croda Uniqema, Inc., Chicago, IL (US); Croda International, PLC, East Yorkshire (GB)

( * ) Notice: Subject to any disclaimer, the term of this patent is extended or adjusted under 35 U.S.C. 154(b) by 141 days.

(21) Appl. No.: 11/589,801

(22) Filed: Oct. 31, 2006

Related U.S. Application Data

(63) Continuation of application No. 10/665,114, filed on Sep. 22, 2003, now abandoned, which is a continuation of application No. PCT/GB02/01006, filed on Mar. 7, 2002.

(30) Foreign Application Priority Data

Mar. 23, 2001 (GB) .................. 0107223.0

(51) Int. Cl.
*C09J 11/06* (2006.01)
*C09J 193/04* (2006.01)

(52) U.S. Cl. ............... 106/218; 106/287.26; 524/77; 524/140; 524/145

(58) Field of Classification Search ............ 524/77, 524/140, 145; 106/218, 287.26
See application file for complete search history.

(56) References Cited

U.S. PATENT DOCUMENTS 3,004,056 A 10/1961 Nunn et al.
5,412,139 A 5/1995 Blanchard et al.
6,653,398 B2 11/2003 Hazen et al.

FOREIGN PATENT DOCUMENTS

EP 0 287 306 A2 10/1988
JP 6 315 1346 A 6/1988
WO 92/01750 2/1992

OTHER PUBLICATIONS

International Search Report of PCT/GB/02/01006 dated Jun. 28, 2006.
Letter dated Aug. 14, 2006 from Gable Gotwals.
Letter dated Jul. 19, 2006 from Bailey Walsh & Co.
'Synperonic' 10 series and 'Synperonic' 13 series: low pour point wetters, detergents and emulsifiers.
Replacement of nonylphenol ethoxylates with alcohol ethoxylates in cleaning formulations.
Replacement of nonylphenol ethoxylates in traffic-film removers.
Atphos Phosphate Esters: Performance In Emulsion Polymerization.
AOCS Books and Special Publications Committee.
Influence of Chemical Structure on the Ecotoxicological Properties of Alkanol Ethoxylates.
Rhodafac Phosphate Esters for latex coatings.
Surfactants & Specialities for Emulsion Polymerization.
Phosphate Surfactants-Properties and Uses.
Nonylphenol Risk Reduction Strategy.
"Synperonic"; Detergents and Surfactants Industry Group.
Abstract; pressure sensitive adhesive composition.

*Primary Examiner*—David M Brunsman
(74) *Attorney, Agent, or Firm*—Jones Day

(57) ABSTRACT

A resin composition contains a tackifying resin and at least one phosphorous containing surfactant having branched alkyl and/or alkenyl group and a polyoxyalkylene group. The resin composition is particularly suitable for use in pressure sensitive adhesives.

13 Claims, No Drawings

RESIN COMPOSITION COMPRISING A PHOSPHOROUS CONTAINING SURFACTANT FOR PRESSURE SENSITIVE ADHESIVES

CROSS REFERENCE TO RELATED APPLICATION

This application is a continuation application of U.S. patent application Ser. No. 10/665,114, filed Sep. 22, 2003, now abandoned, which further is a continuation application of International Application No. PCT/GB02/01006, filed Mar. 7, 2002, which designates the United States. These applications, in their entirety, are incorporated herein by reference.

FIELD OF INVENTION

The present invention relates to a resin composition, in particular to a tackifying resin composition, and especially to a rosin composition, for use in a pressure sensitive adhesive.

BACKGROUND

Pressure sensitive adhesive (PSA) formulations based on e.g. aqueous acrylic and carboxylated styrene/butadiene copolymers usually contain a tackifying resin to impart to the final adhesive formulation, specific properties such as tackiness, peel-resistance and ease of surface wetting.

As is well known in the art, there are two major classes of tackifying resins, namely rosin and derivatives thereof, and hydrocarbon resins. The rosin and derivatives class are obtained from pine trees, and include rosins, modified rosins, and various rosin derivatives, for example rosin esters. The hydrocarbon resin class include low molecular weight polymers produced from a wide variety of monomers mainly based on C5 to C9 hydrocarbons derived primarily from petrochemical sources.

In aqueous PSA formulations, tackifying resins are commonly added in the form of an aqueous dispersion or emulsion, firstly made by melting the resin and then adding a surfactant and water to form a so-called oil-in water emulsion/dispersion where the resin is the dispersed phase and water is the continuous phase. The purpose of surfactants is twofold, namely; a) to decrease the interfacial tension between the water and the resin, hence to aid the dispersion process by creating very small resin particles, and b) to provide long-term stability to the so-obtained resin dispersion. There are a large variety of known surfactants, but they are not all suitable for use in tackifying resins. In particular, the use of many surfactants can result in the tackifying resin dramatically reducing the cohesive strength of the adhesive.

PRIOR ART

WO 92/01750 describes the use of a phosphorous containing surface active agent in tackifying resins. WO 92/01750 is particularly directed to the use of a phosphate ester surfactant containing a nonyl phenyl group. Unfortunately, surfactants containing phenyl groups are increasingly coming under scrutiny for alleged adverse environmental effects. In addition, there is a commercial need to provide improvements over the surfactants used in WO 92/01750, particularly with regards to stability of the resin composition and low foaming properties. There is also a requirement for resin compositions having resin particles of small particle size and uniform particle size distribution.

SUMMARY OF THE INVENTION

We have now surprisingly discovered a resin composition which overcomes or significantly reduces at least one of the aforementioned problems.

Accordingly, the present invention provides a resin composition comprising a tackifying resin and at least one phosphorous containing surfactant comprising a branched alkyl and/or alkenyl group and a polyoxyalkylene group.

The invention also provides a pressure sensitive adhesive comprising a tackifying resin and at least one phosphorous containing surfactant comprising a branched alkyl and/or alkenyl group and a polyoxyalkylene group.

The branched alkyl and/or alkenyl group, preferably alkyl group, of the surfactant used in the present invention suitably comprises in the range from 8 to 20, preferably 9 to 18, more preferably 10 to 16, particularly 11 to 14, and especially 12 to 13 carbon atoms on average by weight. As the numerical value for the number of carbon atoms is expressed as an average (ie mixtures are preferred), it may be non-integral. In a preferred embodiment, preferably greater than 50%, more preferably greater than 70%, particularly greater than 80%, and especially greater than 85% and up to 100% by weight of the branched alkyl and/or alkenyl groups are within the aforementioned preferred ranges for the number of carbon atoms.

The longest linear chain of the branched alkyl and/or alkenyl group is preferably in the range from 7 to 12, more preferably 7.5 to 11.5, particularly 8 to 10, and especially 8.5 to 9.5 carbon atoms on average by weight. The branched group preferably contains greater than 1, more preferably in the range from 1.5 to 6, particularly 2 to 5, and especially 3 to 4 branches on average by number. The branches (hereinafter referred to as side-branches) are preferably alkyl groups, more preferably attached directly to a carbon atom of the longest linear chain. The one or more side-branched alkyl groups suitably have a carbon chain length in the range from 1 to 8, preferably 1 to 5, more preferably 1 to 3, particularly 1 to 2, and especially 1, ie a methyl group. In a preferred embodiment of the invention, greater than 50%, more preferably greater than 70%, particularly greater than 90%, and especially greater than 95% and up to 100% by number of the side-branched groups are methyl groups.

The molecular weight of the branched alkyl and/or alkenyl group of the phosphorous containing surfactant is preferably in the range from 130 to 260, more preferably 140 to 230, particularly 160 to 210, and especially 170 to 190.

The polyoxyalkylene group of the surfactant used in the present invention, is preferably of the formula $(C_mH_{2m}O)_n$ where m is preferably 2, 3 or 4, and more preferably 2 or 3, i.e. an oxyethylene or oxypropylene group. The polyoxyalkylene chain may be substantially or wholly of oxyethylene residues, or substantially or wholly of oxypropylene residues, or it may include both oxyethylene and oxypropylene residues to give a random or block copolymer chain. The chain is preferably a homopolymeric polyoxyethylene chain. The value of n is suitably in the range from 3 to 40, preferably 4 to 25, more preferably 5 to 15, and particularly 6 to 10, especially where the polyoxyalkylene chain is substantially or wholly a polyoxyethylene chain. Where the chain is a block or random copolymer of oxyethylene and oxypropylene residues the chain length chosen will typically correspond to the above ranges, but will depend upon the proportion of oxyethylene and oxypropylene residues in the chain. In copolymer chains usually oxyethylene residues will provide at least 60 mole % of the total oxyalkylene residues. Oxybutylene residues can be included in the chain, but when present these will usually be present as a minor component of the chain e.g. up to about 20 mole % of the total polyoxyalkylene chain. The numerical values of numbers of repeat units in the polyoxyalkylene chain are of course average values, and may be non-integral.

The phosphorous containing surfactant used in the present invention is preferably in the form of a phosphate ester, and more preferably has the general formula (1):

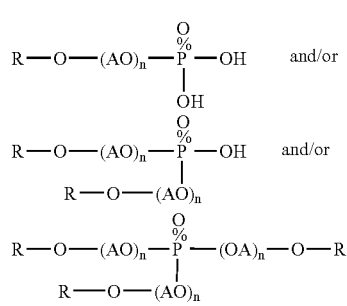

wherein R is a branched alkyl and/or alkenyl group, $(AO)_n$ is a polyoxyalkylene group, and n is in the range from 3 to 40. The individual R groups and $(AO)_n$ groups may be the same or different.

Phosphate ester surfactants can be formed through the reaction of an alcohol or alcohol alkoxylate and a phosphorylating agent,

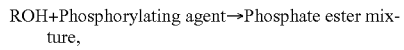

where ROH is a fatty alcohol, or a fatty alcohol alkoxylate. This reaction usually gives a complex mixture of various components i.e. mono-phosphate ester ($ROP(OH)_2O$)), di-phosphate ester (($RO)_2P(OH)O$)), and tri-phosphate ester (($RO)_3PO$)), complex mineral phosphates (e.g. poly/pyro phosphates), residual nonionic surfactant (precursor) and phosphoric acid. The relative amounts of these constituents depend upon the manufacturing route (eg $P_2O_5$ or tetraphosphoric acid (TPA)) and the specific reaction conditions. The $P_2O_5$ route is known to normally give di-ester as major component, whilst the TPA process generally favours the production of the mono-ester derivative.

The phosphorous containing surfactant preferably comprises (i) in the range from 10 to 90%, more preferably 30 to 85%, particularly 45 to 80%, and especially 55 to 75% by weight of mono-phosphate ester, (ii) in the range from 10 to 90%, more preferably 15 to 60%, particularly 18 to 40%, and especially 20 to 25% by weight of di-phosphate ester, and (iii) less than 15%, more preferably less than 10%, particularly less than 8%, and especially less than 3% by weight of tri-phosphate ester.

The phosphorous containing surfactant used in the present invention may be produced by firstly alkoxylating a branched alkyl and/or alkenyl group, eg by alkoxylation of primary branched fatty alcohol under conventional alkoxylation conditions, typically under alkali catalysis, particularly alkoxide catalysis e.g. using NaOH or KOH to form alkoxide in situ. Suitable branched primary alcohols can be substantially wholly branched alcohols, as can be made by the guerbet process e.g. 2-butyloctanol, 2-butyldecanol, 2-butyldodectanol, 2-hexyl-octanol, 2-hexyldecanol, 2-hexyldodectanol and 2-octyldecanol; or they can be mixtures of the above branched primary alcohols with linear primary alcohols, containing similar numbers of carbon atoms, such as can be made by the oxo process starting with internal olefins. The alkoxylated species can then be phosphorylated as described above. Alternatively, commercially available alkoxylated surfactants, such as Synperonic 13 (trade mark) (ex Uniqema), which contain a branched alkyl and/or alkenyl group may be phosphorylated.

The phosphorous containing surfactant may be in an acid or in a neutralised form. The neutralised form is preferably used in resin compositions according to the present invention. Suitable counter ions include those derived from alkali metals (suitably provided as hydroxide or carbonate), from amines, especially tertiary amines including hydroxyalky amines especially alkanolamines such as triethanolamine (TEA) or diethanolamine (DELA) or mixtures thereof. The phosphorous containing surfactant may be neutralised before addition to the resin or in-situ, ie by blending both the surfactant and the neutralizing agent into the resin before dispersion or emulsification. The neutralizing agent is preferably added in excess to reach an overall end pH of the resin composition in the range from 4.5 to 11, more preferably 6.5 to 9.

The resin composition according to the present invention may also comprise, in addition to a phosphorous containing surfactant having a branched alkyl and/or alkenyl group (so-called branched species) as defined herein, an equivalent phosphorous containing surfactant having a linear alkyl and/or alkenyl group, ie containing no branched chains (so-called linear species). The ratio by weight % of branched:linear species is preferably in the range from 20 to 100:80 to 0, more preferably 40 to 100:60 to 0, particularly 80 to 100:20 to 0, and especially 95 to 100:5 to 0. In a particularly preferred embodiment the phosphorous containing surfactant comprises greater than 98% by weight of branched species.

The amount of phosphorous containing surfactant, including both branched and linear species (if present), in a resin composition according to the present invention is preferably in the range from 1 to 30%, more preferably 2 to 20%, particularly 5 to 15%, and especially 8 to 12% by weight based on the weight of the tackifying resin.

The phosphorous containing surfactant, or mixtures thereof, may be used alone or in combination with one or more other surfactants, other anionic surfactants or nonionic surfactants. Cationic surfactants are not normally used in tackifying resin compositions. Suitable examples of other anionic surfactants include sulphates, carboxylates, sulphonates, sulphosuccinates and derivatives thereof. Suitable examples of non-Ionic surfactants include alkoxylated amines, alcohols, amides or fatty acids, polyoxyalkylene, eg oxyethylene and oxypropylene, block or random copolymers, carbohydrate based surfactants, sorbitan derivatives and complex polyesters.

The tackifying resin is preferably rosin and derivatives thereof, or a hydrocarbon resin. The rosin and derivatives include rosins, modified rosins, and various rosin derivatives. Suitable rosins include gum rosin, wood rosin or tall oil rosin and blends thereof. Modified rosins or rosin derivatives may be produced by reactions such as polymerisation, fortification, disproportionation, hydrogenation or esterification. Fortified rosins are produced by reacting rosins with dienophiles, such as maleic acid, acrylic acid. Disproportionated rosins have been reacted in a catalytic process in order to improve their stability to oxidation. Esterified rosins are produced by reacting rosins with an alcohol, preferably a polyol such as glycerol.

The hydrocarbon resins include low molecular weight polymers produced from a wide variety of monomers mainly based on C5 to C9 hydrocarbons primarily derived from petrochemical sources. The preferred hydrocarbon resins used preferably have a softening point in the range from 10 to 190° C., more preferably 60 to 120° C., and preferably have a molecular weight (number average) in the range from 300 to 10000, more preferably 300 to 2000.

The concentration of tackifying resin in the resin composition according to the present invention is preferably in the range from 10 to 90%, more preferably 20 to 80%, particularly 30 to 70%, and especially 40 to 60% by weight based on the total weight of the composition.

A more complete and comprehensive overview of the tackifyer chemistry and their use can be found in "The handbook of Pressure Sensitive Adhesive Technology" edited by D. Satas (Van Nostrand Reinhold, New York, 1989).

Other materials may be included in the resin composition, added either prior to, during or after preparation of the dispersion or emulsion thereof. Suitable materials include additives or process aids such as antifoam agents or defoamers, neutralising or buffering agents which may be added to adjust the pH of the composition, viscosity modifiers, antioxidants, biocides and emulsion stabilisers such as casein or cellulosic derivatives.

The tackifying resin dispersion or emulsion of the invention can be made, for example, either by the well known direct or by the inverse emulsification process. The direct method, although effective, does not give the most stable resin emulsion/dispersion as the resultant resin droplets generally have a relatively large size and/or a broad particle size distribution. The inverse method involves, firstly forming a mixture of the resin and surfactant(s), adding water to form a transient water-in-oil (resin) emulsion, continuing water addition until the emulsion inverts to form an oil (resin)-in-water emulsion. If necessary, further water can be added to adjust the disperse phase content of the emulsion to that desired. This technique is known in the art as the Emulsion Inversion Point (EIP) method. Generally, prior to the inversion, the viscosity of the water-in-oil emulsion is typically fairly high (reflecting the viscosity of the resin continuous phase) and the mixture is stirred vigorously to help reduce the particle size of the resin droplet. After inversion, the mechanical energy can usually be reduced because the viscosity falls substantially. The temperature at which the method is carried out depends on the softening and/or melting point. For solid or highly viscous resins, elevated temperatures may be needed.

The resin composition according to the present invention is particularly suitable for use in a pressure sensitive adhesive (PSA) formulation. Preferred uses include slicing tapes in the paper industry, self adhesive labels, laminates, and adhesives used in the medical area such as operating tapes. In addition, such PSA's suitably contain non-adhesive species such as acrylic and carboxylated styrene/butadiene co-polymers, vinyl acetate homopolymers, vinyl acetate and ethylene copolymers, natural rubbers etc.

The invention is illustrated by the following non-limiting examples.

EXAMPLES

(i) Synthesis of Surfactant

The phosphorous containing surfactants were produced using the $P_2O_5$ phosphation route. Well dried $P_2O_5$, either as a granular powder or as a finely divided solid, was added gradually, with vigourous agitation, to the ethoxylated non-ionic precursor. The phosphation reaction was exothermic and, in some cases, cooling was required to prevent the temperature from exceeding 100° C., which can lead to strong coloration of the end-products. The reaction was allowed to proceed for an additional period of time up to 3 hours at ambient temperature, in order to ensure that no $P_2O_5$ remains. The reaction mixture was cooled and discharged, and contained a mixture of mono-, di- and tri-phosphate esters of the ethoxylated non-ionic precursor, with small amounts of unreacted ethoxylated non-ionic precursor and complex polyphosphate derivatives.

The following ethoxylated non-ionic precursors were used to make the phosphorous containing surfactants;

Surfactant B—branched alkyl group is 60% C13, 30% C12, having an average of 3 to 4 methyl side branches; polyoxyalkylene group is 6 ethylene oxide (EO) groups on average.

Surfactant C—as B but 9 EO groups on average.

Surfactant D—as B but 12 EO groups on average.

Surfactant E—branched alkyl group is C12 to C15, having an average of 1 alkyl side branch, polyoxyalkylene group is 6 EO groups on average. Also contains 40% by weight of equivalent linear species.

Surfactant F—as E but 10 EO groups on average.

Surfactant A is a commercially available phosphate ester surfactant—Atphos 3205 E (trade mark) (ex Uniqema) (a nonyl phenyl with an average of 9 EO groups). This is used in the comparative Examples, not according to the present invention.

(ii) Production of Resin Composition

Resin emulsions/dispersions were made using the inversion emulsification method in which water was added to the disperse phase components under vigorous stirring, initially forming a water-in-oil emulsion, until the emulsion inverts into the desired oil-in-water emulsion. The tackifying resin was firstly melted in the emulsification vessel, the surfactants produced above melted (if necessary) and added to the resin along with triethanolamine (TEA) and the mixture stirred thoroughly. The tackifier resins were emulsified at temperatures of about 95° C. in a water bath, by stirring with a laboratory mixer (max. 2000 rpm) using either 2-bladed or 6-bladed paddle stirrers of 4 cm diameter (peripheral speed: max 4.2 m/s). After inversion, the emulsion viscosity suddenly decreased, and the stirring reduced, eg to about 0.6 $m.s^{-1}$ peripheral speed. Table 1 gives the generic formulation used in all the Examples.

TABLE 1

| Component | Quantity (% w/w) |
| --- | --- |
| Tackifying resin | 50 |
| TEA (99%) | 2 |
| Surfactant | 4 |
| Demineralised water | Up to 100 |

(Iii) Testing Procedures

Particle Size Analysis

The emulsion particle size of the resin composition was measured using a Malvem Xetasizer 4. The polydispersity was calculated instrumentally. Particle size was measured at a pH of 6.6+/−0.2.

Emulsion pH

The pH of the resin composition was measured using a WTW pH 537 meter.

Foaming Test

A 5 g sample of the resin composition was diluted to 100 ml with demineralised water in a 250 ml graduated cylinder. The cylinder was then turned over 20 times and the foam stability/persistency determined as a function of time (measured as foam head in cm).

Viscosity

The viscosity of the resin composition was measured with a Brookfield LVT (spindle 2).

Shear (Mechanical) Stability

The resin composition was mixed with a commercial acrylic dispersion typically used in the preparation of pressure sensitive formulations. These mixtures were sheared for 1 hour at 2000 rpm with a 4.5 cm diameter disc dissolver. Shear stability was estimated by measuring the particle size of the combined acrylic and resin composition before and after application of the shear forces.

Example 1

The tackifying resin used was a stabilised rosin ester. Tables 2 and 3 give the particle size data and the foaming data respectively of the resultant emulsions.

TABLE 2

| Surfactant | Average Particle Size (nm) | Polydispersity | Mean Particle Size (nm) |
|---|---|---|---|
| A (Comp) | 166 | 0.23 | 185 |
| E | 170 | 0.05 | 174 |
| B | 149 | 0.06 | 153 |
| D | 163 | 0.01 | 164 |

TABLE 3

| Surfactant | Initial Foaming | Foaming after 5 min. | Foaming after 20 min. |
|---|---|---|---|
| A (Comp) | 100 | 84 | 65 |
| E | 90 | 10 | 10 |
| B | 60 | 0 | 0 |
| D | 80 | 12 | 2 |

Example 2

The tackifying resin used was a rosin ester having an acid value of 9 mg KOH/g and a softening point of about 65° C. The particle size of the obtained emulsions are given in Table 4.

TABLE 4

| Surfactant | Average Particle Size (nm) | Polydispersity | Mean Particle Size (nm) |
|---|---|---|---|
| A(Comp) | 192 | 0.03 | 187 |
| B | 167 | 0.07 | 163 |
| C | 177 | 0.06 | 165 |
| F | 187 | 0.05 | 177 |

Example 3

Tackifying resins produced above were mixed with an acrylic dispersion, and the average particle size of the mixture was determined both before and after shear was applied. The smaller the change in particle size observed, the better the shear stability of the mixed system. The particle size results (in nm) and % variation are given in Table 5.

TABLE 5

| Shear Stability | Acrylic Dispersion | Surfactant A (Comp) | Surfactant B | Surfactant D | Surfactant F |
|---|---|---|---|---|---|
| Before | 101 | 177 | 154 | 154 | 152 |
| After | 104 | 181 | 150 | 154 | 153 |
| % Variation | 3 | 2.2 | −2.6 | 0 | 0.65 |

The above examples illustrate the improved properties of a resin composition according to the present invention.

The invention claimed is:

1. A resin composition comprising a tackifying resin and at least one phosphorous containing surfactant comprising a polyoxyalkylene group terminating in a branched group selected from the group consisting of branched alkyl and branched alkenyl groups and mixtures thereof.

2. A resin composition according to claim 1 wherein the at least one phosphorous containing surfactant is at least one phosphate ester.

3. A resin composition according to claim 1 wherein the branched group is an alkyl group comprising in the range from 8 to 20 carbon atoms.

4. A resin composition according to claim 1 wherein the longest linear chain of the branched alkyl and/or alkenyl group comprises in the range from 7 to 12 carbon atoms.

5. A resin composition according to claim 1 wherein the polyoxyalkylene group is of the formula $(C_mH_{2m}O)_n$ wherein m is 2, 3 or 4, and n is in the range from 5 to 15.

6. A resin composition according to claim 1 wherein the tackifying resin is selected from the group consisting of rosins, tackifying resin derivatives of rosins, hydrocarbon resins and mixtures thereof.

7. A pressure sensitive adhesive comprising a tackifying resin and at least one phosphorous containing surfactant comprising a polyoxyalkylene group terminating in a branched group selected from the group consisting of branched alkyl and branched alkenyl groups and mixtures thereof.

8. A resin composition comprising a tackifying resin and at least one phosphorous containing surfactant comprising a polyoxyalkylene group terminating in a branched group selected from the group consisting of branched alkyl and branched alkenyl groups and mixtures thereof, wherein the branched group comprises in the range from 1.5 to 6 side-branches on average by number.

9. A resin composition according to claim 8 wherein the at least one phosphorous containing surfactant is at least one phosphate ester and the branched group is an alkyl group comprising in the range from 8 to 20 carbon atoms.

10. A resin composition according to claim 8 wherein at least one side-branch comprises in the range from 1 to 3 carbon atoms.

11. A resin composition according to claim 10 wherein greater than 50% by number of the side-branches are methyl groups.

12. A resin composition according to claim 8 wherein the polyoxyalkylene group is of the formula $(C_mH_{2m}O)_n$ wherein m is 2, 3 or 4, and n is in the range from 5 to 15.

13. A resin composition according to claim 8 wherein the tackifying resin is selected from the group consisting of rosin, tackifying resin derivatives of rosins, hydrocarbon resins and mixtures thereof.

* * * * *